UNITED STATES PATENT OFFICE.

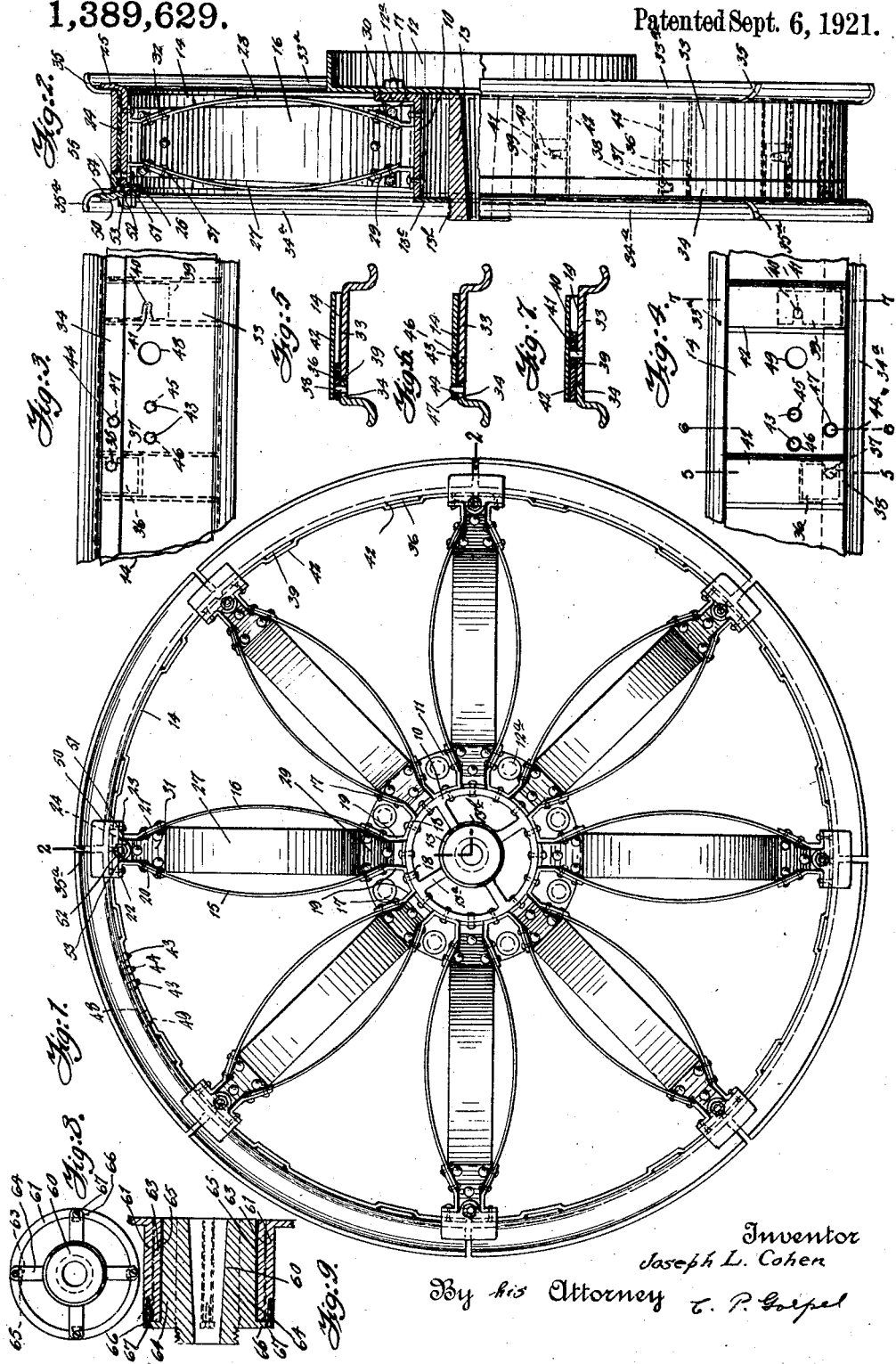

JOSEPH L. COHEN, OF NEW YORK, N. Y.

VEHICLE-WHEEL.

1,389,629.

Specification of Letters Patent.

Patented Sept. 6, 1921.

Application filed February 20, 1920. Serial No. 360,058.

*To all whom it may concern:*

Be it known that I, JOSEPH L. COHEN, a citizen of the United States, and a resident of the borough of Manhattan, in the city, county, and State of New York, have invented certain new and useful Improvements in Vehicle-Wheels, of which the following is a specification.

The present invention relates to vehicle wheels, and particularly wheels of the resilient type, an object of the invention being to provide a wheel of great inherent strength, and at the same time of a resiliency so responsive to the rough conditions of road usage as to so absorb and annihilate the shocks as to prevent their being felt to any extent by the occupants of the vehicle.

I particularly propose to provide an improved form of spring spoke and a coöperating spring rim adapted, as will hereinafter appear, to deflect as obstructions are encountered and to effectually absorb the shock within the wheel, and in which the deflected portion will immediately return to normal position.

An object of the invention is to provide a tire carrying flanged rim rendered resilient by means of spaced points of deflection capable of local deflection to a substantially large degree, and which will coöperate with the spring spoke members in a manner as to render the wheel inherently absorbent to shocks.

I further propose to provide improved spoke members, and which may be referred to as spoke groups, in which a plurality of spring members coöperate about a single radial axis, to provide a compressible and expansible support between the hub and the rim, and in which the coöperating springs are so variably tensioned as to produce compensating and assisting moments adapted to render the wheel of great strength, produce a quick return to normal position, and prevent crystallization or other destructive conditions due to an excessive use of the springs. The spoke groups are especially effective in taking up and resisting the strains from torque, and side force, and provide a positive transmission of the rotary propelling force between the hub and the rim.

Another object of the invention is to provide a rim which will permit of quick mounting and removal of the tires with facility, permitting tire changes upon the road without great inconvenience or loss of time.

A further general object of the invention is to provide a construction lending itself to modern methods of manufacture to the end that the same may be produced quickly, in great quantities and at comparatively small cost.

With these and other objects in view, embodiments of my invention are shown in the accompanying drawings, and these embodiments will hereinafter be more fully set forth, and eventually pointed out in the claims.

In the drawings:

Figure 1 is a side elevation of a vehicle wheel embodying one form of my invention;

Fig. 2 is an edge view partly in section, the section being taken along the line 2—2 of Fig. 1;

Fig. 3 is an enlarged detail view of a portion of the rim, and showing the outside of the same;

Fig. 4 is a similar view showing the inside;

Figs. 5, 6 and 7 are transverse sectional views of the rim taken respectively along the lines 5—5, 6—6 and 7—7 of Fig. 4;

Fig. 8 is an end view of a modified form of hub construction, and,

Fig. 9 is a longitudinal vertical sectional view thereof.

Similar reference characters indicate corresponding parts of the several figures of the drawings.

Referring to the drawings, and more particularly to Figs. 1 and 2 thereof, the embodiment of my invention shown therein comprises a cylindrical hub 10 provided at its rear end with a laterally extending flange 11 secured in the case of the rear wheel to the brake drum 12 by means of nuts and bolts 12$^a$; and provided with a central axle engaging hub 13, connected thereto by integral longitudinally extending radially disposed flanges or ribs 13$^a$, the hub 13 projecting beyond the hub 10, and being screw threaded, as at 13$^b$, and provided with a cap or cover plate 13$^c$ closing the space between the hubs 10 and 13.

The rim felly 14 is in the form of a continuous flexible band, flat in cross section, and unflanged, and between the felly and the hub the spoke groups are arranged and secured, the tire carrying rim, as will presently be more fully pointed out, being removably mounted upon the felly.

The spoke groups each comprise a plurality of bowed spring members arranged about a common radial axis, these members being four in number in the present embodiment, two of the members, 15 and 16 being oppositely bowed, having their concave sides toward each other and arranged with their edges parallel to the plane of rotation of the wheel, and having their wide surfaces at right angles thereto, these members being substantially wide and of gradually decreasing width toward their outer ends, and being of a width at their inner ends extending substantially the greater length of the hub 10. At their inner ends the spring members 15 and 16 are riveted or otherwise suitably secured to the outer sides of U-shaped members 17, having their base portions 18 concentric to the hub and riveted thereto between the spoke groups. The lower portions 19 of the sides of the said members are parallel to the corresponding portions of the adjacent members, while the upper portions are curved correspondingly to the curvature of the spring members, which are riveted to these portions. The members 17 are of heavy spring material.

The outer ends of the spring members 15 and 16 are riveted to members 20 and 21, corresponding substantially in shape to the side portions of the members 17 and secured at their outwardly bent base portions 22 and 23 to plates 24 riveted to the felly 14, these plates being bent outwardly at their inner ends, as at 25, and bent inwardly at their outer ends at 26.

The other two spring members 27 and 28 of the spoke groups are disposed at right angles to the members 15 and 16, their longitudinal axes being in a radial plane, and are riveted at their ends to members 29, 30, 31 and 32, corresponding in cross section to the members 20 and 21, and are secured respectively to the hub and the plate 24, being disposed between the attachment members of the spring members 15 and 16.

The spring members 15 and 16 are equally spaced from each other at their inner and outer ends, and the attachment members 29, 30, 31 and 32 are shaped, as indicated in Fig. 1, to fit these spaces, the spring members 27 and 28 being of equal width throughout their length, and substantially narrower than the members 15 and 16. The spacing of the attachment members 29, 30, 31 and 32 from each other is substantially greater than the spacing of the attachment members of the spring members 15 and 16, so that while the spacing of the spring members 15 and 16, and 27 and 28 from each other at their greatest points of deflection is substantially equal, the degree of curvature of the members 15 and 16 is greater than that of the members 27 and 28.

The spring members 15 and 16, being wider than the members 27 and 28, are of greater curvature, their tension being greater than on the members 15 and 16, and, as a result of this arrangement a compensating and assisting action takes place, which makes a more responsive construction adapted to quickly return to normal position. The arrangement of the members 27 and 28 within the members 15 and 16 and about a common radial axis, enables transmission of the rotary motion from the hub to the rim without excessive turning of the rim relative to the hub, in other words, in a substantially positive manner, so that the spring members 15 and 16 will not be subjected to distortion from torque strains, while the spring members 15 and 16 resist side force, preventing distortion from this source. As a result both torque and side force are effectually compensated and resisted, and at the same time a thoroughly flexible spoke structure is provided for taking up shock from the road.

The tire carrying rim consists of two circumferential parts 33 and 34, formed of metal, having a relatively high degree of resiliency to permit of local deflection thereof at the portion adjacent the road, as will more fully hereinafter appear. The rim portion 33 is relatively wider than the rim portion 34, and is provided at its outer edge with a flange 33$^a$, having a plurality of spaced cut-outs 35 in line with the axes of the spoke groups. The rim portion 34 is provided with a flange 34$^a$, similar to the flange 33$^a$, and also provided with a plurality of spaced cut-outs 35$^a$ alined with the cut-outs 35.

The felly 14, being unflanged, and of substantially great resiliency, local deflection of the rim is permitted. In spaced relation upon the inner side of the rim portion 33 there are welded or otherwise suitably secured plates 36, extending over upon the inner side of the portion 34 in the engaged position of the rim portions, being provided with recesses or cut-outs 37, constituting hook portions, and which, upon relative circumferential turning movement of the rim portions, are engaged with or disengaged from pins 38, provided on the rim portion 34. Similarly, the rim portion 34 has welded thereon plates 39, extending over upon the rim portion 33, and provided with cut-outs 40, adapted to engage pins 41, provided on the rim portion 33. Inwardly bent channels or recesses 42 are formed on the felly to accommodate the plates 36 and 39. A pair of spaced pins 43 are provided, upon and projecting inwardly from the rim portion 33, and a single pin 44 is provided intermediately thereof on the rim portion 34, and are adapted in the disengaged position of the rim from the felly, to be engaged by a suitable lever or bar to enable the two rim portions to be turned relatively to each other to either connect or disconnect them. Three correspondingly positioned holes 45, 46 and 47 are provided on the felly, and are adapted to be engaged by the pins when the rim is mounted to thereby lock the rim portions against turning movement relatively to each other, there being sufficient clearance between the inner surface of the rim and the outer surface of the felly to enable the pins to be initially engaged with the said holes in the felly, and thereupon swung into place. In proximity to the said holes and pins there are provided respectively in the rim portion felly holes 48 and 49 for the reception of the tire valve.

In the engaged position of the rim upon the felly it is abutted at its inner side by the outwardly bent portions 25 of the plates 24, and is thereupon fixed in place by means of holding plates 50, mounted upon the inwardly bent portions 26 of the said plates 24, being provided with a reduced apertured portion 51 engaged by a screw threaded stud 52 upon the said portion 26, and held thereon by nuts 53, the main portion engaging the side of the flange 34ª over a portion of the cut-out 35ª, and extending substantially at each side thereof. The inwardly bent portion 26 of the plate 24 is disposed slightly inwardly of the outer surface of the flange 34ª, and the plate 50 is slightly offset, as at 54, forming a shoulder 55, which prevents turning movement of the plate in the tightened position of the nuts, thereby effectually retaining the rim upon the felly. Sufficient clearance or play is allowed, however, between these parts to enable the proper functioning of the rim. By loosening the nuts 53, the offset portion may be moved out of engagement with the rim flange, and the plates swung inwardly out of retaining relation.

In Figs. 8 and 9 I have illustrated a modified form of hub construction, in which the inner axle engaging hub 60 is removable from the wheel hub 61. Upon the periphery of the hub 61 there are provided dovetailed ribs, 63, extending from the inner edge of the hub, and upon the hub 60 there are provided radially disposed longitudinally extending ribs or flanges 64, having dovetailed channels 65 engaged with the ribs 63 of the hub 61, outwardly extending lugs 66 at the end of the ribs 64 engaging the outer wheel hub 61 limiting the position of the hub 60, screws 67 fixing the same in place.

I have illustrated and described preferred and satisfactory embodiments of my invention, but it is obvious that changes may be made therein within the spirit and scope thereof, as defined in the appended claims.

I claim:

1. In a vehicle wheel, a hub, spoke groups carried thereby, each comprising a pair of oppositely bowed spring means disposed in the plane of the wheel, and a pair of oppositely bowed spring means in a plane at right angles thereto, and arranged about a radial axis, the degree of curvature and tension of one pair of said bowed spring means being greater than the degree of curvature and tension of the other pair, and a resilient tire carrying rim mounted upon said spoke groups.

2. In a vehicle wheel, a hub, spoke groups carried thereby, each comprising a pair of oppositely bowed spring means disposed in the plane of the wheel, and a pair of oppositely bowed spring means in a plane at right angles thereto, and arranged about the same radial axis, the degree of curvature and tension of one pair of said bowed spring means being greater than the degree of curvature and tension of the other pair, the spaces between the adjacent spring means of each of said pairs at their greatest point of deflection being substantially equal, and a resilient tire carrying rim mounted upon said spoke groups.

3. In a vehicle wheel, a hub, a resilient felly, flat in cross section, resilient spoke members therebetween, and a tire carrying rim removably mounted on said felly, provided at its circumferential edges with tire retaining flanges, said flanges being provided with radially disposed cut-outs in spaced relation to each other, adapted to render said rim resilient.

4. In a vehicle wheel, a hub, a resilient felly flat in cross section, resilient spoke members therebetween, and a tire carrying rim removably mounted on said felly, provided at its circumferential edges with tire retaining flanges, said flanges being provided with radially disposed cut-outs in spaced relation to each other, substantially in radial alinement with said resilient spoke members, and adapted to permit local deflection of said rim.

5. In a vehicle wheel, a hub, a felly, resilient spoke means therebetween, attachment means for said spoke members at the felly end of said spoke means, provided at one end with outwardly bent portions projecting outwardly at one side of said felly, and inwardly bent portions at the other end projecting inwardly from the other side of said felly, a tire carrying rim removably mounted upon said felly, abutted at one edge by said outwardly bent portions, and retaining means mounted upon said inwardly bent portions adapted to be fixed in retaining relation to said rim.

6. In a vehicle wheel, a hub, a rim, spoke members therebetween, an inner axle engaging hub disposed within said first-mentioned hub in spaced relation thereto, a plurality of radial longitudinally extending ribs on said inner hub disposed in the space between said first-mentioned hub and said inner hub and slidable longitudinally relatively to said first-mentioned hub, coöperating means on said first-mentioned hub and said inner hub, adapted to prevent relative turning movement of said hub, and means adapted to fix said inner hub relatively to said first-mentioned hub against longitudinal sliding movement.

In testimony that I claim the foregoing as my invention, I have signed my name hereunder.

JOSEPH L. COHEN.